(12) United States Patent
Fukada

(10) Patent No.: US 6,722,616 B2
(45) Date of Patent: Apr. 20, 2004

(54) METHOD OF LIFT CONTROL OF AIRCRAFT AND SYSTEM THEREFOR

(75) Inventor: Yoshiki Fukada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/026,881

(22) Filed: Dec. 27, 2001

(65) Prior Publication Data

US 2003/0122038 A1 Jul. 3, 2003

(51) Int. Cl.[7] ............................................. B64C 13/18
(52) U.S. Cl. ..................... 244/203; 244/225; 244/221; 244/178; 244/75 R
(58) Field of Search ............................. 244/76 R, 198, 244/199, 203, 195, 13, 225, 221, 75 R, 701, 222, 233, 178

(56) References Cited

U.S. PATENT DOCUMENTS

| | | | | | |
|---|---|---|---|---|---|
| 1,627,004 | A | * | 5/1927 | Albessard | 244/225 |
| 1,830,429 | A | * | 11/1931 | Elsby, Jr. | 244/225 |
| 1,832,254 | A | * | 11/1931 | Spanovic | 244/225 |
| 1,869,326 | A | * | 7/1932 | Ludlow | 244/233 |
| 2,385,845 | A | * | 10/1945 | Schairer | 244/13 |
| 2,430,793 | A | * | 11/1947 | Wells | |
| 2,442,289 | A | * | 5/1948 | Garehime | 244/222 |
| 2,460,374 | A | * | 2/1949 | Walls | 244/233 |
| 2,523,427 | A | * | 9/1950 | Hampshire | 244/178 |
| 2,611,563 | A | * | 9/1952 | Ross | 244/221 |
| 2,623,718 | A | * | 12/1952 | Ryder | 244/221 |
| 2,697,567 | A | * | 12/1954 | Fiedler | 244/233 |
| 2,705,117 | A | * | 3/1955 | Ross | 244/233 |
| 2,971,725 | A | * | 2/1961 | Jakimiuk | |
| 3,075,727 | A | * | 1/1963 | Ellis, III et al | |
| 3,138,353 | A | * | 6/1964 | Steiner | |
| 3,870,253 | A | * | 3/1975 | Leidy et al. | |
| 4,017,045 | A | * | 4/1977 | Kirchhein | 244/178 |
| 4,638,962 | A | * | 1/1987 | Gunter et al. | |
| 4,744,532 | A | | 5/1988 | Ziegler et al. | |
| 4,765,568 | A | * | 8/1988 | Carl et al. | 244/75 R |
| 4,848,700 | A | | 7/1989 | Lockheed | |
| 5,100,081 | A | * | 3/1992 | Thomas | 244/75 R |
| 5,478,031 | A | * | 12/1995 | Piche | 244/195 |
| 5,707,029 | A | * | 1/1998 | McIntosh | 244/225 |

FOREIGN PATENT DOCUMENTS

JP      A 7-10088      1/1995

* cited by examiner

Primary Examiner—Michael J. Carone
Assistant Examiner—L. Semunegus
(74) Attorney, Agent, or Firm—Oliff & Berridge, PLC

(57) ABSTRACT

The present invention is structured such that lift control apparatus such as flaps and flaperons operate in association with elevator operation performed by a pilot. Lift control conforming to elevator operation by the pilot is performed.

21 Claims, 8 Drawing Sheets

METHOD OF LIFT CONTROL OF AIRCRAFT AND SYSTEM THEREFOR

BACKGROUND OF THE INVENTION

1. Field of the Invention

The present invention relates to method and system of lift control of aircraft, and particularly such method and system of lift control of aircraft to generate suitable lift rapidly response to elevators operation.

2. Description of the Related Art

In general, flaps 82 are formed in rear edges of main wings 81 of an airframe 80 of an aircraft, as shown in FIG. 7. The flaps 82 each normally structure portions of the main wings 81.

The flaps 82 are operated to rotate at a suitable angle downward to the main wings from a main wing structuring position to a desired operating position, or rotate upward from the operating position in order to return to the position at which they form a general surface with the main wings 81 when the flaps 82 are operated.

An amount of lift acting on the airframe 80 increases when the flaps 82 are rotated in a downward direction, and the lift decreases when the flaps 82 are rotated in an upward direction. Furthermore, an amount of drag force also increases at the same time when the flaps 82 are operated in the downward direction. The flaps 82 are therefore also operated to rotate in the downward direction in cases when it is necessary to brake the aircraft 80 during flight.

Further, elevators 84 are generally mounted to horizontal tail 83 formed in rear portions of the airframe 80 of the aircraft. The elevators 84 are used in order to point a bow 85 in an upward or downward direction, and are installed in order to perform pitching control of the airframe 80 of the aircraft. The bow 85 therefore rises when a pilot in a cockpit pulls a control stick in a direction toward the rear of the airframe, and the bow 85 drops when the pilot pushes the control stick in a direction toward the front of the aircraft. In other words, the elevators 84 are rotated upward by pulling the control stick backward when the bow 85 is to be raised, and the elevators 84 are rotated downward by pushing forward on the control stick when the bow 85 is to be lowered.

Originally, when an aircraft is made to climb or descend, though depending upon speed of its flight, it takes a predetermined time that the airframe 80 actually climbs or descends after the pilot performs elevators operation by the control stick.

The changes of the attitude of actual airframe in pitching direction after a pilot performs elevators operation by the control stick is explained as an example of airframe 80 climbing in order of a state of the airframe 80 in the process of climb referred to figures.

The pilot first pulls the control stick toward the rear of the airframe and operates the elevators 84 to rotate upward, as shown in FIG. 8 (1). Then, for this elevators operation as shown in FIG. 8 (2), a tail portion 86 of the airframe 86 drops, the bow 85 points upward as a result and the attitude of the airframe 80 becomes upward. The angle of attack of the main wings 81 increases in this case, and the lift generated by airflow from the front becomes larger, as shown in FIG. 8 (3). As a result, the airframe 80 climbs as shown in FIG. 8 (4).

In this case the horizontal tail 83, comprising the elevators 84 of the aircraft, are formed in the tail portion 86 of the airframe. The tail portion 86 of the airframe therefore falls first, and the bow 85 points upward as a result.

Accordingly, when the elevators operation is performed, it takes a predetermined time that the airframe 80 actually climbs or descends after the pilot performs the elevators operation because the aircraft 80 itself has a predetermined length. Further, in order for the airframe 80 to actually begin to climb, one must wait for a predetermined amount of lift to be generated when the bow 85 points upward and the angle of attack of the main wings 81 becomes larger. As a result, it takes a more time.

Therefore although automobiles, for example, are generally structured so that steering is performed in a front end portion of an automobile body by a steering wheel of the front end portion, in comparison time is intrinsically required for the airframe 80 to respond to operations of a rudder upward and downward in the case of aircraft. There is necessity for improvement in the response of the airframe when the elevators operation is performed.

Furthermore, in order to place the aircraft in a landing attitude, procedures such as the following steps relating to aircraft operation are used. Namely, the pilot first operates a throttle lever and descends while increasing or decreasing engine power. Flaps, which are lift control apparatuses mounted to the main wings, are then lowered to a predetermined angle, and the aircraft is decelerated. The elevators of the horizontal tail are then rotated upward by pulling the control stick toward the rear of the aircraft just prior to touchdown, rotating the elevators upward, raising the bow and thereby pulling up the airframe.

Lift is generated in proportion to the square of an airspeed. In this case, at a low speed state during landing, it takes longer time than that in high speed flight until a necessary amount of lift is generated at the main wings after operating the elevators to be upward. The airframe drops greatly during a period until lift is generated, and there are cases in which it is difficult to control the airframe.

It is therefore necessary for a pilot to descend the aircraft by performing the throttle control to increase or decrease the engine power and the raising and lowering operation of the elevators mounted on the horizontal tail during landing. The control of airframe during landing is thus extremely complicated, and this becomes a burden to the pilot in airframe.

Further, when the bow is raised by operating the elevators so as to obtain more lift, the airframe climbs due to the lift generated after a time lag, and there are cases in which an amount of time and distance required for landing is more than necessary.

SUMMARY OF THE INVENTION

An object of the present invention is to provide a method of, and a system for, lift control of an aircraft in which a necessary amount of lift corresponding to a pilot's operation of elevators can easily be obtained.

Further, another object of the present invention is to provide a method of, and a system for, lift control of an aircraft in which an attitude of an airframe in an upward and downward directions can be controlled by conforming with elevators operation by a pilot.

Furthermore, another object of the present invention is to reduce a load required upon a pilot to control an aircraft during landing, when elevators operation is performed by the pilot during landing, by improving ability of response and performing necessary lift control in association with a lift control apparatus by conforming to elevators operation.

The present invention therefore has a structure in which lift control apparatuses such as flaps and flaperons operate in association when elevators operation is performed by a pilot, thus performing lift control rapidly corresponding to pilot's elevators operation.

Therefore, in accordance with the present invention, lift control apparatuses such as flaps and flaperons operate in association with pilot's elevators operation, and a necessary amount of lift can be obtained without a time lag. As a result, according to the present invention, ability of response of pitching control with elevators of an aircraft can be greatly improved over conventional pitching control.

In particular, although delicate throttle control and elevators operation have been necessary conventionally in order to avoid an airframe from descending during a period from after elevators operation until lift is generated because speed of the airframe is reduced during landing, a necessary amount of lift can be obtained without a time lag when performing elevators operation in accordance with the present invention. Difficulties in pilot's control of the airframe during landing can be reduced, and a safer landing can be achieved.

The present invention is therefore a method of lift control of an aircraft by controlling lift acting upon the aircraft based on a state of elevators operation. Lift control apparatuses operate in association based on the a state of the elevators operation, and lift corresponding to the flying state of an airframe is obtained.

As a result, ability of response of the steering control of an aircraft in vertical motion is improved because a desired amount of lift can be obtained by the lift control apparatuses in response to elevators operation, and preferred airframe operation can be realized in accordance with the present invention.

Further, another aspect of the present invention is that when the elevators are operated in order to climb, the amount of lift is controlled with the lift control apparatuses so as to increase, and when the elevators are operated in order to descend, the amount of lift is controlled with the lift control apparatuses so as to decrease.

Attitude control of an airframe in the vertical motion can therefore be easily and quickly performed in accordance with the present invention because lift in both an increasing direction and in a decreasing direction can be obtained with the lift control apparatuses in accordance with the pilot's elevators operation.

In addition, another aspect of the present invention is that an operation amount in a direction for increasing the lift of the lift control apparatuses is controlled so as to become smaller in accordance with the airframe speed becoming lower, and is controlled so as to become smaller in accordance with the airframe speed becoming higher.

Another aspect of the present invention is that it is structured so that control in a direction increasing the lift of the lift control apparatuses is not performed in cases in which there is a possibility of an airframe stalling when performing the aforementioned control when aircraft speed is low.

Another aspect of the present invention is that it is structured so that control in directions for increasing or decreasing the amount of lift of the lift control apparatuses is not performed when the aircraft speed is high.

If the lift control apparatuses operate and increase the amount of lift, drag force acting on the airframe increases at the same time. From a standpoint of ensuring safety of the airframe, an amount of operation of the lift control apparatuses is controlled so as to gradually become smaller as speed decreases when the aircraft speed is low. Furthermore, there is a danger of stalling if the lift control apparatuses operate when the speed of the aircraft is lower than a predetermined speed. It is structured such that operation of the lift control apparatuses is controlled so as not to be performed if there is the possibility of stalling.

Further, when an aircraft is flying at a speed which is greater than a predetermined speed, then lift control with the lift control apparatuses in association with the elevators operation is unnecessary because lift is proportional to the square of the velocity and a necessary lift can be obtained without a large time lag. The operation amount so as to increase or decrease the lift of the lift control apparatuses is controlled so as to become smaller in accordance with the airframe speed becoming larger.

In addition, when the speed of an aircraft reaches or exceeds a fixed speed, then lift can be obtained without a time lag in cases where this type of lift control is performed, and therefore smooth flight is inhibited. The present invention is thus structured such that lift control is not performed in association with elevators operation for cases in which the speed of the airframe is equal to or higher than a fixed speed.

Another aspect of the present invention is that, during landing of the aircraft, the lift control apparatuses are reset by being controlled so as to increase lift when the elevators are operated for climb after the lift control apparatuses are set in a predetermined angular state. In addition, when the elevators are operated for descent, then the lift control apparatuses are reset by being controlled so as to decrease lift.

In general, during landing of an aircraft, a pilot first operates lift control apparatuses such as flaps by a predetermined amount, lowering the flight speed, and then operates elevators to lift up a bow. Next, throttle operation and elevators operation by using a control stick is performed, regulating the descent speed of the airframe and its descent attitude, and thereby performing touchdown.

The present invention is structured such that the lift control apparatuses operate in association with the elevators, and therefore the lift control apparatuses initially set by the pilot are then reset later so that lift increases in association with the pilot operating the elevators for climb. In other words, it is structured such that, when the aircraft enters on a landing phase, the flaps which are first set to a predetermined angle by the pilot are then moved to a higher angle position due to the elevators being operated upward, and the necessary amount of lift accompanying the bow being raised by operating the elevators upward is obtained.

Similarly, it is structured such that, after initially setting the lift control apparatuses when the aircraft enters on the landing phase, necessary lift control accompanying the bow being lowered is performed when the elevators are operated so as to descend in order to perform the pitching control of the airframe.

As a result, it is not necessary for the pilot to descend while performing attitude control of the airframe by only operating the throttles and elevators because the necessary amount of lift can be obtained with the present invention when the elevators are operated without the time lag found conventionally. It thus becomes possible to increase stability and to reduce a load required upon a pilot to control an airframe during landing.

Another aspect of the present invention is that angular position of the lift control apparatuses set by the pilot are detected along with an operation state when the elevators are operated by the pilot. Information relating to the angular position of the lift control apparatuses, information relating to the elevators operation state, and information on the speed of the airframe are taken as a basis, and information relating to a correlation between the aircraft speed and the amount of operation of the lift control apparatuses are referenced, and the amount of operation of the lift control apparatuses is determined.

The angular position of the lift control apparatuses is are detected by, for example, detecting the state in which the flaps indicator switch formed inside a cockpit is set with a predetermined sensor. Further, information relating to the elevators operation may be an amount of elevators operation, and it may be a speed of elevators operation. In addition, it may be structured such that the lift control apparatuses is controlled on the basis of the amount of elevators operation and the speed of elevators operation.

The amount of elevators operation is calculated by detecting an amount of control stick operation, and the amount of lift control apparatus operation is determined in proportion to the amount of elevators operation. Further, the amount of lift control apparatus operation is determined based upon the speed of elevators operation by detecting the elevators operation speed. By operating the lift control apparatuses based upon the speed of elevators operation, the lift control apparatuses can be operated and the necessary amount of lift can be immediately obtained when elevators operation begins due to the control stick operated by the pilot. More real-time lift generation conforming to elevators operation can thus be made possible.

In this case, the amount of elevators operation can be detected by sensors mounted in the control stick for detecting the amount of elevators operation of the control stick. Further, the elevators operation speed is calculated by, for example, always detecting the amount of elevators operation at predetermined intervals of time (for example, approximately $\frac{1}{100}$ second), finding the difference between the amount of elevators operation at the present detection point with the amount of elevators operation at the previous detection point, and dividing the numerical value of the difference by the length of the time interval of the detection.

Furthermore, it becomes necessary to consider the speed of the airframe at this point for operation control of the lift control apparatuses because lift is generated proportional to the square of the velocity. The airframe speed in this case may be the airspeed in this case. The airspeed may be measured by a Pitot static tube mounted to the airframe.

Further, in the present invention an ECU used in this lift control stores in advance a map for obtaining the necessary amount of lift. The map is composed of a graph relating to airframe speed information and the amount of lift control apparatuses operation necessary at the airframe speed. The initial graph is referenced based on data relating to the detected airframe speed, the initially set flaps indicator position, and the state of elevators operation, and the amount of operation of the lift control apparatuses is determined.

Another aspect of the present invention is that it is provided with: a step of detecting an indicator position at the point for the lift control apparatuses; a step of detecting airframe speed; a step of detecting the amount of elevators operation; a step of detecting the speed of elevators operation; a step of judging whether to perform control of the lift control apparatuses in association with the elevators operation so that the lift increases, or so that the lift decreases; a step of determining a command value for controlling the lift control apparatuses based on the amount of elevators operation; and a step of determining a command value for controlling the lift control apparatuses based on the speed of elevators operation.

Further, another aspect of the present invention is that it is structured having: a step of detecting a stall warning signal from a stall warning apparatus that emits a warning in case there is a possibility that the airframe may stall if the angle of attack of the airframe becomes equal to or larger than a predetermined angle; and a step of judging whether or not the stall warning signal has been detected. Operation of the lift control apparatuses in a direction for increasing lift is not performed in cases in which the stall warning signal is detected.

This is done if there is a possibility of stalling in order to avoid a situation in which the danger of stalling is made even greater because the amount of drag force increases at the same time as the lift control apparatuses are operated in a direction for increasing lift.

Further, another aspect of the present invention is that the elevators operation amount and operation speed are detected based upon operating a control stick mounted in a cockpit.

Furthermore, the lift control apparatuses may be flaps, and further they may also be flaperons. Flaperons are lift control apparatuses prepared on the main wings of an airframe and function as flaps and at the same time also play a role as ailerons.

Further, another aspect of the present invention is that it is a lift control system for an aircraft and structured as follows. A lift control system is provided with: a lift control apparatus operating portion capable of suitably setting lift control apparatuses so as to obtain a predetermined amount of lift for an airframe; speed sensors for detecting airspeed; and a driver apparatus for driving the lift control apparatuses based upon commands from the lift control apparatuses operating portion. The present invention is provided with elevators operation state detection sensors capable of detecting the elevators operation state by a control stick mounted in a cockpit, and has a map relating to a correlation between airframe speed and amount of operation of the lift control apparatuses in order to obtain a necessary amount of lift. Information relating to the elevators operation state obtained by the elevators operation state detection sensors, and information relating to the airframe speed is taken as a basis, the map is referenced, and an operation amount for the lift control apparatuses is obtained. The lift control apparatuses are operated by the driver apparatus based on the operation amount obtained.

In this case, the information relating to the elevators operation state may be the amount of elevators operation in accordance with the control stick, it may be the speed of elevators operation in accordance with the control stick, and in addition, it may be the amount of elevators operation and the speed of elevators operation due to the control stick.

Furthermore, another aspect of the present invention is that it is provided with a stall warning apparatus that emits a warning in case there is a possibility of an airframe stalling because the angle of attack of the airframe is equal to or greater than a predetermined angle at a given speed. When the stall warning apparatus operates, then operation of the lift control apparatuses in a direction for increasing lift is prohibited.

DETAILED DESCRIPTION OF THE PREFERRED EMBODIMENTS

Hereinafter, the present invention is explained in detail based upon embodiments shown in the attached figures.

Figure 1:
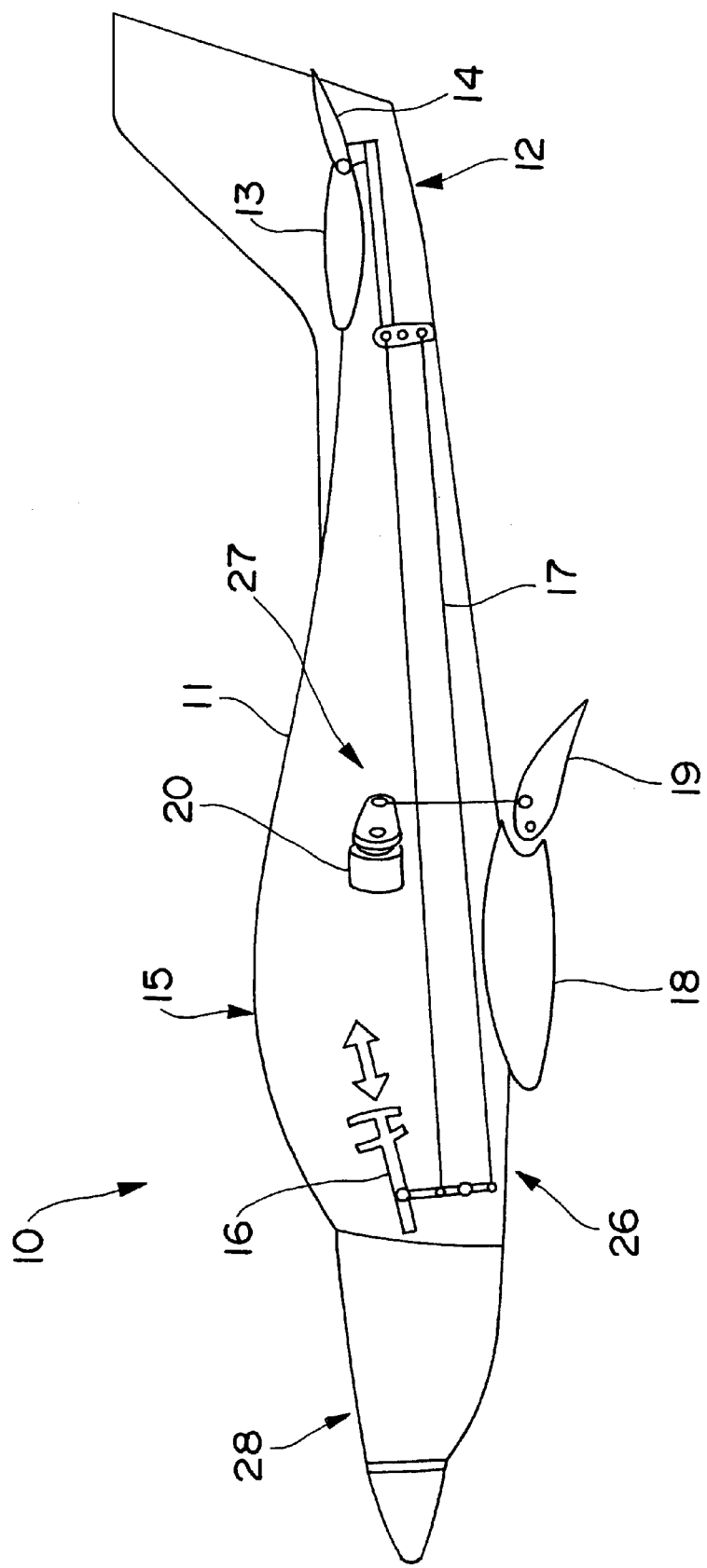
FIG. 1 is a diagram showing an airframe related structure in which an aircraft lift control system of the present invention is applied.

An aircraft lift control system of this embodiment is structured with elevators control mechanism 26 and flaps control mechanism 27 which are similar to conventional mechanisms, as shown in FIG. 1.

Namely, elevators 14 are provided in a horizontal tail 13 formed in a tail portion 12 of an airframe 11 of an aircraft 10. The elevators 14 are joined by a cable 17 to a control stick 16 mounted inside a cockpit 15, and are mechanically operated by the control stick 16. Further, flaps 19 are formed in a main wing 18 as a lift control apparatus, and driven by a flap motor 20.

Figure 2:
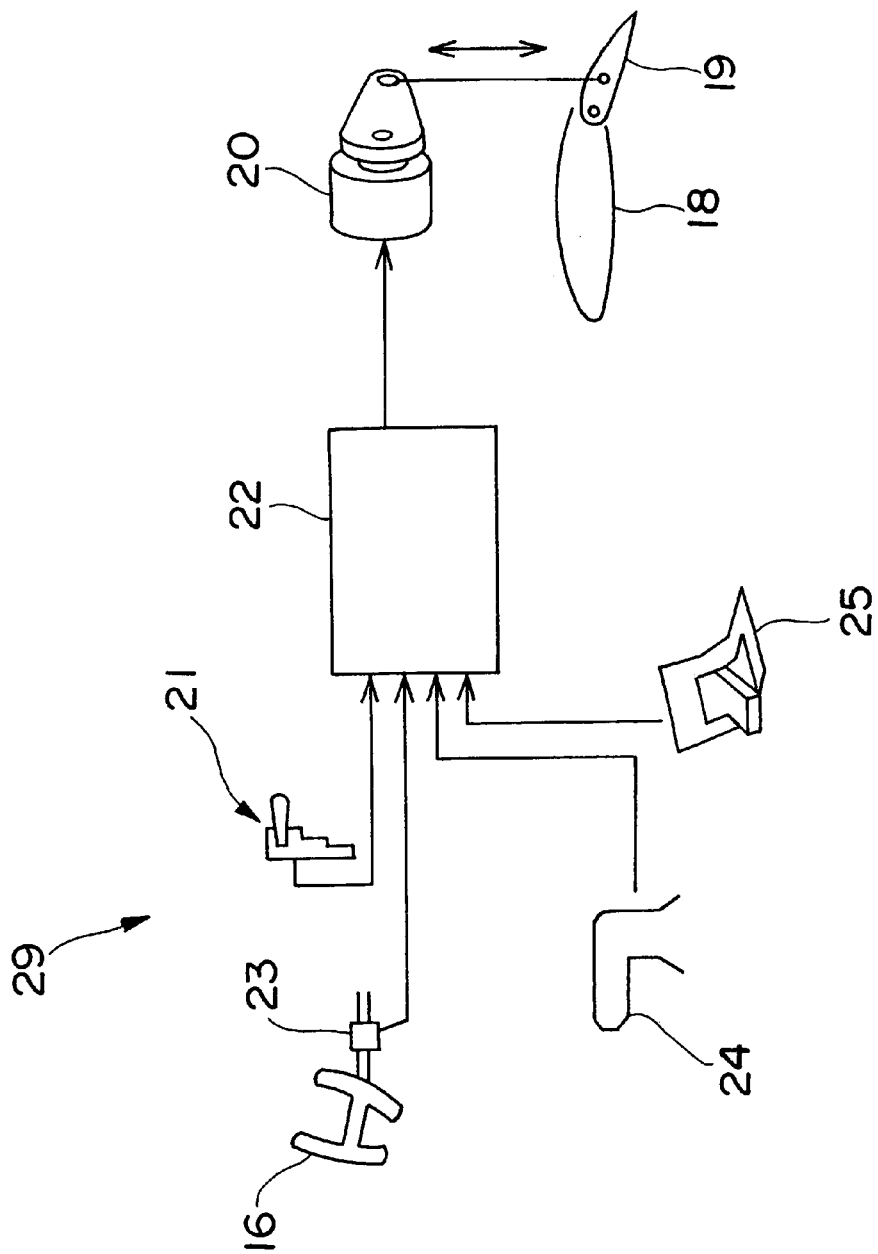
FIG. 2 is a schematic diagram showing an embodiment of the aircraft lift control system of the present invention.

Then, as shown in FIG. 2, the flap control mechanism 27 is controlled by a flap control system 29 in the present embodiment. Namely, the flap control system 29 is structured by: a flap indicator switch 21 provided inside the cockpit 15 and operated manually by a pilot; an elevators operation amount sensor 23 built into the control stick 16; a speed sensor 24 capable of detecting airframe speed; a stall warning apparatus 25 which emits a warning signal in case there is a danger of an airframe stall; and an ECU 22 to which signals from the flap indicator switch 21, the elevators operation amount sensor 23, the speed sensor 24, and the stall warning apparatus 25 are input, and which outputs predetermined control signals to the flap motor 20 for a drive control.

The flaps 19 are set to a suitable angle by the pilot by operating the flap indicator switch 21 inside the cockpit 15. When the flap indicator switch 21 is operated, the a signal from the flap indicator switch 21 is input to the ECU 22, and the ECU 22 sends a corresponding operation signal to the flap motor 20 and the flaps 1 are driven.

Further, the elevators operation amount sensor 23 is structured so as to be capable of detecting the amount of elevators operation based upon a displacement amount of the control stick 16 in directions toward the front and rear of the airframe. The speed sensor 24 is structured from with a Pitot static tube so as to be capable of detecting the airspeed of the airframe 11, and the value of the airspeed detected by the speed sensor 24 is input to the ECU 22. In addition, the stall warning apparatus 25 is structured so as to output a signal to the ECU 22 in case the angle of attack of the main wing 18 becomes equal to or greater than a predetermined value and there is a danger of stalling.

The flaps 19 are structured in this embodiment so as to operate in concern with the act of the elevators 14. Namely, the elevators operation amount sensor 23 detects the amount of operation of the control stick 16 when the pilot pulls back on, or pushes forward on, the control stick 16 to operate the elevators 14 for climbing or descending. The detected value is output to the ECU 22, and the ECU 22 calculates the amount of the elevators operation.

Further, in this case the ECU 22 also calculates the operating speed when the pilot operates the elevators 14, and calculates the amount of the elevators operation based upon the operating speed. The operating speed of the elevators 14 is calculated by detecting the amount of elevators operation a plurality of times at short time intervals (for example, intervals of 1/100 second). The difference between the amount of elevators operation at a given detection point and the amount of elevators operation at the previous detection point is found, and the numerical value of this difference is divided by the amount of time between detection intervals, thus computing the speed.

A control command value of the flaps 19 are therefore determined based upon both the amount of elevators 14 operation and the elevators 14 operating speed in this embodiment. In this case, a control amplitude value (A) for the flaps 19 based upon the amount of elevators 14 operation is computed in accordance with a predetermined map stored in the ECU 22 by referring to the speed of the airframe 11.

A control amplitude value (B) for the flaps 19 based upon the operating speed of the elevators 14 is computed in accordance with a predetermined map stored in the ECU 22 by similarly referring to the speed of the airframe 11. In this case lift is obtained by operating the flaps 19 immediately corresponding to the operating speed of elevators 14, and it becomes possible to generate a necessary amount of lift for the airframe 11 very rapidly.

Figure 3:
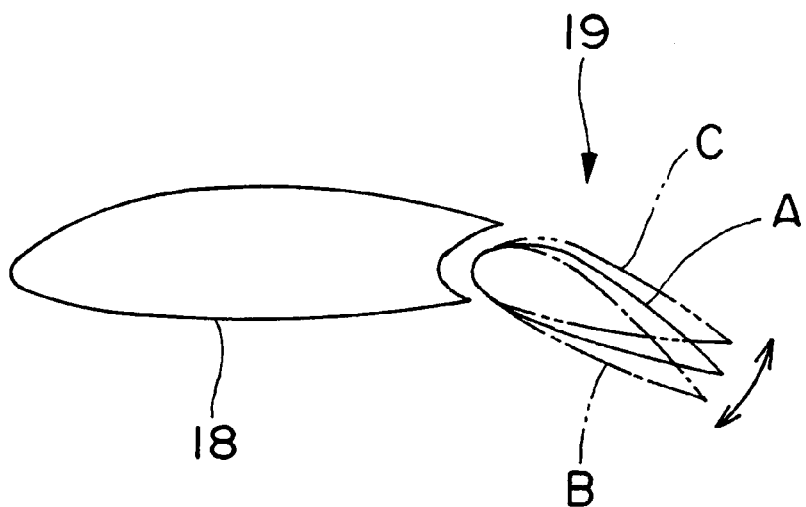
FIG. 3 is a schematic diagram showing an operation state for flaps controlled by the aircraft lift control system of the present invention.

Next, as shown in FIG. 3, the ECU 22 determines in which vertical direction it is necessary to operate the flaps 19 at present, and by how much from an angular position A of the flaps 19 set manually by the pilot. The determination is made based upon the amount of elevators 14 operation and on the operation speed, and a resultant signal is then output to the flap motor 20.

In this case, when the elevators 14 is operated by the pilot so as to climb, the pilot desires to either climb or to reduce descent, and a very large amount of lift becomes necessary. The flaps 19 are thus reset to a lower angular position B, for example, based upon the amount of operation computed as stated above. On the other hand, when the pilot operates the elevators 14 so as to descend, the pilot desires to either descend or to reduce climb, and it is necessary to reduce lift because a bow 28 points downward. The flaps 19 are thus reset to a higher angular position C, for example, based upon the aforementioned amount of operation computed. As a result, the flaps 19 operate by a predetermined angular portion, at a predetermined speed, along with the aforementioned elevators operation. A necessary amount of lift conforming to the elevators operation is thus obtained rapidly.

Further, the ECU 22 is structured such that control of the flaps 19 in the downward direction is canceled, avoiding the danger of stalling due to an increase in drag, in cases where a stall warning is output from the stall warning apparatus 25.

Figure 4:
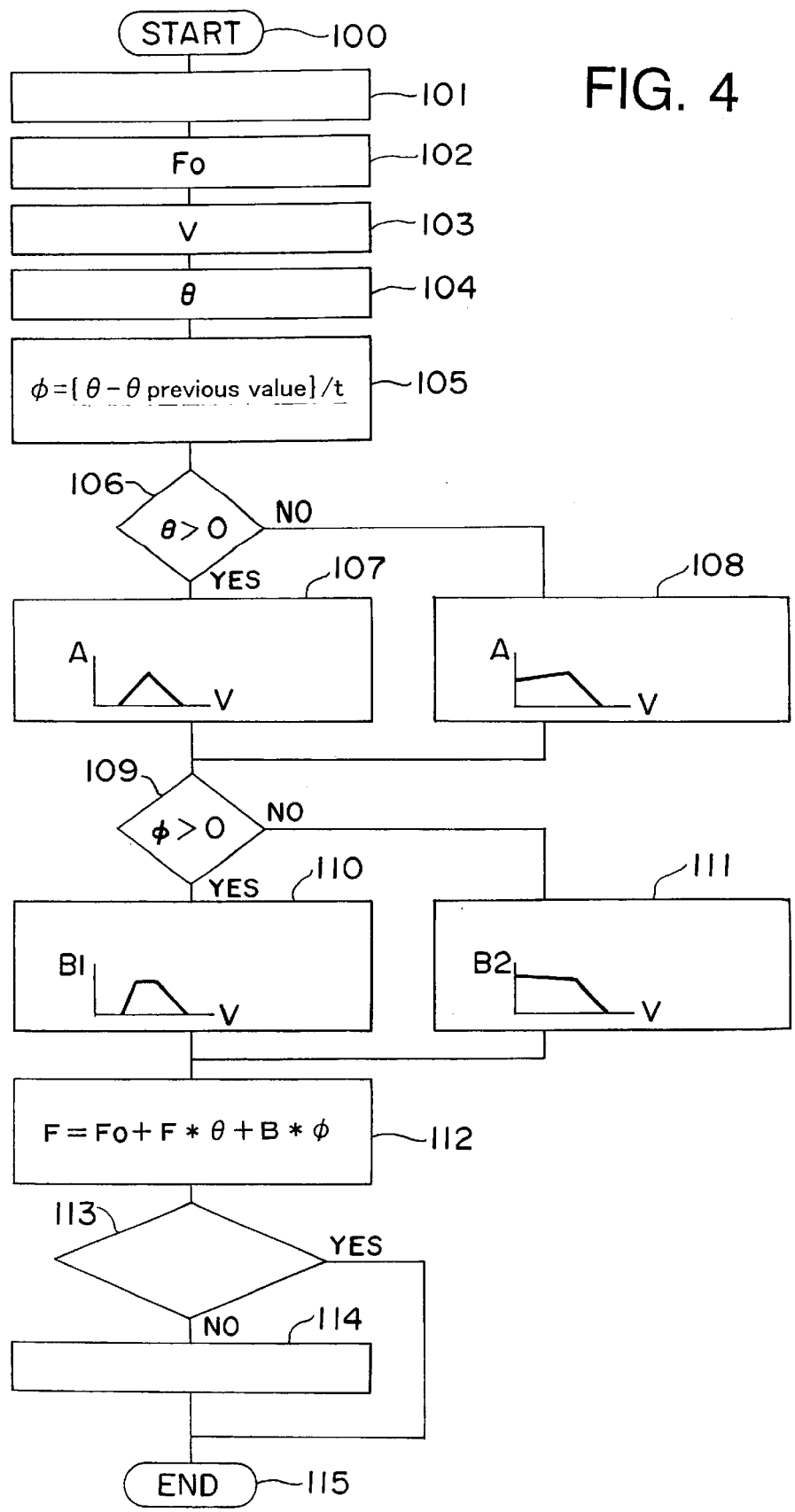
FIG. 4 is a flow chart showing the aircraft lift control method of the present invention.

A method of controlling aircraft lift of the present invention is explained based upon a flow chart shown in FIG. 4.

If an ignition switch in an engine of the aircraft is in an "on state," then the flap indicator switch 21, the elevators operation amount sensor 23, the speed sensor 24, and the stall warning apparatus 25 are all in an operational state, the flow chart stored with in the ECU 22 starts (Step 100), and is repeatedly performed for each extremely small time interval (for example, $\frac{1}{100}$ second).

First, when the stall warning apparatus 25 is operating at this stage and a stall warning signal is being output, then the signal is input to the ECU 22 (Step 101). When the aircraft has entered into preparation for landing, the pilot sets the flaps to a predetermined angle manually by using the flap indicator switch 21, and after that the airframe is brake, and descent begins. A flap indicator position ($F_0$) set manually is output to the ECU 22 as a signal value (Step 102). The speed sensor 24 detects airspeed (V) of the airframe 11 at this point, and the detected value is output to the ECU 22 (Step 103).

Next, when the airframe 11 descends and nears the surface of the earth, the pilot operates the elevators 14 for climb by pulling on the control stick 16, and the bow 28 rises. The elevators operation amount sensor 23 detects an amount of elevators 14 operation ($\theta$) from the amount of the operation of the control stick 16, and this is output to the ECU 22 (Step 104). In this case, the value of the amount of elevators 14 operation ($\theta$) in the flow chart is considered to be a "−" value when the angular position of the flaps moves upward, and is considered to be a "+" value is the angular position of the flaps moves downward, with the angular position of the flaps 19 set at present manually by the pilot through the flap indicator switch 21 taken as a value of "0."

Further, as stated above, the flow chart is repeatedly run through at intervals on the order of around $\frac{1}{100}$ second, and therefore the ECU 22 samples the amount of elevators 14 operation ($\theta$) previously detected by the elevators operation amount sensor 23 and finds the difference between the sampled value and the amount of elevators 14 operation ($\theta$) detected at present. An elevators 14 operation speed ($\phi$) is computed by dividing the value of this difference by a detection interval (t) between the current and previous detection processes (Step 105).

Corresponding to the amount of elevators 14 operation ($\theta$), in this case the value of the elevators 14 operating speed ($\phi$) in the flow chart is also considered to be a "−" value when the angular position of the flaps 19 moves upward, and is considered to be a "+" value is the angular position of the flaps 19 moves downward, with the angular position of the flaps 19 set at present taken as a value of "0."

Next, a determination is made regarding whether or not the amount of elevators 14 operation ($\theta$) is greater than zero (Step 106). When the amount of elevators 14 operation ($\theta$) is greater than zero, namely when the amount has a "+" value, then this is a case in which the flaps 19 has moved to point lower than the presently set flaps angular position. This is a case in which the pilot has operated the elevators 14 for climb by pulling on the control stick 16, and the bow 28 is pulled up.

Conversely, when the amount of elevators 14 operation ($\theta$) is less than zero, namely when the amount has a "−" value, then this is a case in which the flaps 19 have moved higher than the presently set flaps angular position. This is a case in which the pilot has operated the elevators 14 for descent by pushing on the control stick 16, and the bow 28 is pushed down.

The value of $\theta>0$ when the elevators 14 is operated for climb in accordance with this judgement, and therefore processing proceeds to Step 107. The detected airspeed (V) of the airframe is taken as a basis and an amount (A) for the flaps 19 to move lower from the presently set angular position of the flaps 19 at the airspeed (V) is computed by using the map stored in the ECU 22.

Further, when the pilot operates the elevators 14 for descent, then processing proceeds to Step 108. Similarly to the above, the detected airspeed (V) of the airframe is taken as a basis and a control amplitude (A) for the flaps 19 to move higher from the presently set angular position of the flaps 19 at the airspeed (V) is computed by using the map stored in the ECU 22.

The map becomes the maximum gain during landing.

In this case, when operation of the elevators 14 for climb is performed, and the flaps 19 are operated so as to be additionally lowered from the presently set position, then lift is controlled so as to become larger. Drag also becomes larger at the same time, and from the standpoint of ensuring the safety of the aircraft control, the amount that the flap 19 moves is controlled so as to become smaller in accordance with the speed of the airframe as it becomes slower. The amount that the flap 19 moves is similarly controlled so as to become smaller when the speed of the airframe becomes high.

For a similar reason, in cases of operating the flaps 19 so as to be lowered additionally from its presently set position when the speed of the aircraft is slow, the aforementioned control is not performed when there is a possibility that the airframe may stall when this control is performed. Conversely, when the airframe 11 of the aircraft has reached a speed equal to or greater than a predetermined speed, then operations to lower the flap 19 are not performed because a necessary amount of lift can be obtained without a large time lag by only operating the elevators 14.

On the other hand, when the elevators 14 is operated for descent, then $\theta<0$ and processing proceeds to Step 108. In Step 108, the flaps 19 are operated to be raised higher than its presently set angular position, and thus the amount of drag is reduced. The predetermined control amplitude value (A) for the flaps 19 is determined in this case as well by referring to the speed of the airframe 11 at the appropriate point.

In contrast to Step 107, the operation of Step 108 may also be performed in cases in which the speed of the airframe is low from the viewpoint of safety. However, at a speed equal to or greater than a predetermined speed, lift control can be performed without a large time lag by operating only the elevators 14 in this case as well. Therefore the amount that the flap 19 moves becomes smaller as the airspeed (V) becomes larger, and this control is not performed when the airspeed becomes equal to or greater than a predetermined speed.

A judgement is made next in Step 109 as to whether or not the operating speed ($\phi$) of the elevators 14 is greater than zero.

As stated above, the value of the elevators 14 operating speed ($\theta$) in the flow chart is considered to be a "−" value when the angular position of the flaps 19 move upward, and is considered to be a "+" value when the angular position of the flaps 19 move downward, with the angular position of the flaps 19 set at present taken as a value of "0." The operating speed of the flaps 19 therefore is such that $\phi>0$ when the elevators 14 is operated for climb and the flaps 19 move downward. It is determined to proceed to Step 110. A control amplitude value (B1) for the flaps 19 is determined in Step 110 by referencing the speed of the airframe 11 at the appropriate point.

This case is similar to that of Step 107. Control is performed such that it becomes smaller in accordance with the speed of the airframe 11 becoming lower, and control also becomes smaller as the speed of the airframe 11 becomes higher. Further, for a similar reason, this control is not performed if there is the possibility of the aircraft stalling if control is performed in cases in which the speed of the aircraft is low and the flaps 19 are operated so as to be lowered further from its presently set position. In addition, operations to lower the flaps 19 are not performed if the airframe 11 of the aircraft has reached a speed equal to or greater than a predetermined speed.

On the other hand, when the flaps 19 operating speed ($\phi$) is such that $\phi<0$ for a case in which the elevators 14 is operated for descent and the flaps 19 are moved upward, then a judgement is made to proceed to Step 111. A control amplitude value (B2) for the flaps 19 are determined in Step 111 by referencing the speed of the airframe 11 at the appropriate point.

An operation to raise the flaps 19 upward from its present angular position is performed in Step 111, the operation that reducing drag. In contrast to Step 110, this can be performed even in cases in which the speed of the airframe is low. However, at a speed equal to or greater than a predetermined speed, lift control can be performed without a time lag by operating only the elevators 14 in this case as well. Therefore the amount that the flap 19 moves becomes smaller as the airspeed (V) becomes larger, and this control is not performed when the airspeed becomes equal to or greater than a predetermined speed.

A control command value (F) for the flaps 19 are determined next in Step 112.

The control command value (F) for the flaps 19 are computed by the equation shown below.

$$F = \text{flap indicator position } (F_O) + A*\theta + B*\phi$$

The control command value (F) is determined based on the current flap indicator position ($F_0$) set by the pilot through the flap indicator switch 21, the control amplitude value (A) for the flaps 19 determined in Steps 107 and 108, and the control amplitude value (B) for the flaps 19 set in Steps 110 and 111.

The control amplitude value (A) for the flaps 19 obtained in Step 107 and the control amplitude value (B1) for the flaps 19 obtained in Step 110 are considered in controlling the flaps 19 in a direction lower than the current indicator position of the flaps 19. On the other hand, the control amplitude value (A) for the flaps 19 obtained in Step 108 and the control amplitude value (B2) for the flaps 19 obtained in Step 111 are considered in controlling the flaps 19 in a direction higher than the current indicator position of the flaps 19.

As a result, the flaps 19 are controlled to move lower when the control command value (F) for the flaps 19 greater than zero, and the flaps 19 are controlled to move higher when F<0.

Lastly, a judgement is made in Step 113 as to whether or not a stall warning is being output from the stall warning apparatus 25. When a stall warning is being output, then the ECU 22 stops this routine without performing Step 114 in which the control command value (F) for the flaps 19 to the flap motor 20 for cases in which the elevators 14 is operated for climb and the flaps 19 are controlled in a lower direction. On the other hand, if a stall warning is not being output, then processing proceeds to Step 114, and the ECU 22 outputs the control command value (F) for the flaps 19 that was finally determined in Step 112 to the flap motor 20.

The flaps 19 move to a predetermined angle due to the output of the control command value (F), based upon the movement amount of the flaps 19 obtained in Step 107 and the movement amount of the flaps 19 obtained in Step 110. As a result, a necessary amount of lift can be obtained for the airframe 11 in its present state without a time lag.

Further, in cases in which the elevators 14 is operated for descent and the flaps 19 are controlled in an upward direction, there is no increase in drag. Processing therefore proceeds past Step 113 and in Step 114 the ECU 22 outputs the control command value (F) of the flaps 19 that was determined finally in Step 112 to the flap motor 20.

As a result, the flaps 19 move upward by a predetermined angle from the position initially set manually by the pilot, and lift is reduced. Therefore when the pilot, for example, operates the elevators 14 for climb during landing and raises the bow too much, the flaps 19 move in response to this, and for cases in which lift is too large, the flaps 19 are raised by operating the elevators 14 for descent. Regulation of lift can thus be performed.

Figure 5:
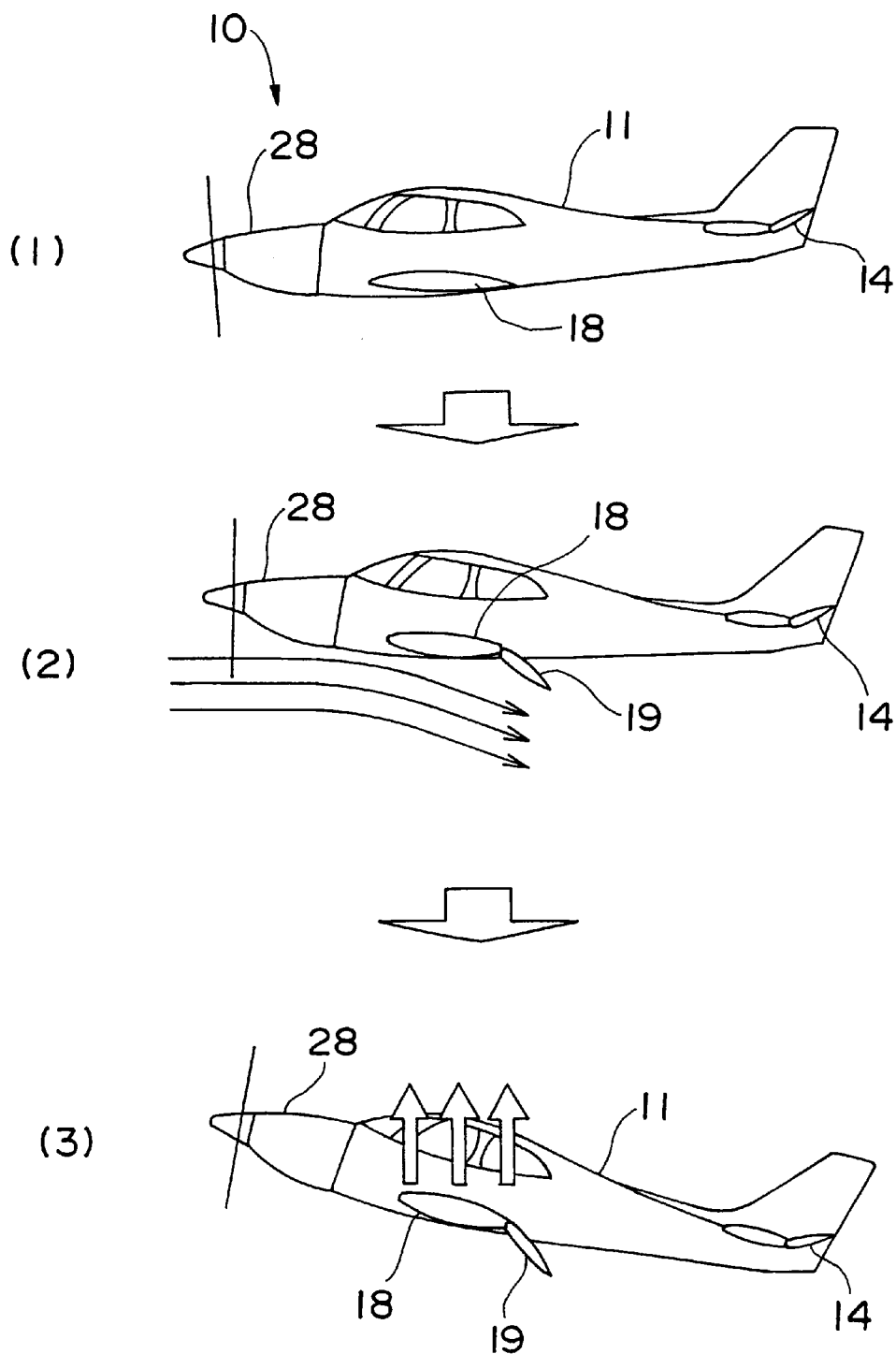
FIGS. 5(1) to 5(3) are diagrams showing attitude changes in an airframe when elevators are operated on an aircraft provided with an aircraft lift control method and system of the present invention.

The flaps 19 therefore moves in concert with movement of the elevators 14, as shown in FIG. 5(2), and a necessary amount of lift can be obtained using the method of, and system for, controlling the lift of an airplane of this embodiment for cases in which the pilot operates the elevators 14 for climb, as shown in FIG. 5(1). As a result, the control stick response in pitching control of the airframe 11 is increased because lift conforming to elevators 14 operation can be obtained without passing through a conventional process in which the elevators 14 is operated for climb, the bow rises, and then lift is generated.

In addition, in particular during landing, it is not necessary to descend by only operating a throttle opening regulator and operating the elevators after once setting the flaps to a predetermined angular position, as is necessary with a conventional aircraft 80, if using the aircraft 10 to which the method of, and system for, lift control of an aircraft of this embodiment is installed. The load required upon the pilot during landing control operations can thus be reduced.

Figure 6:
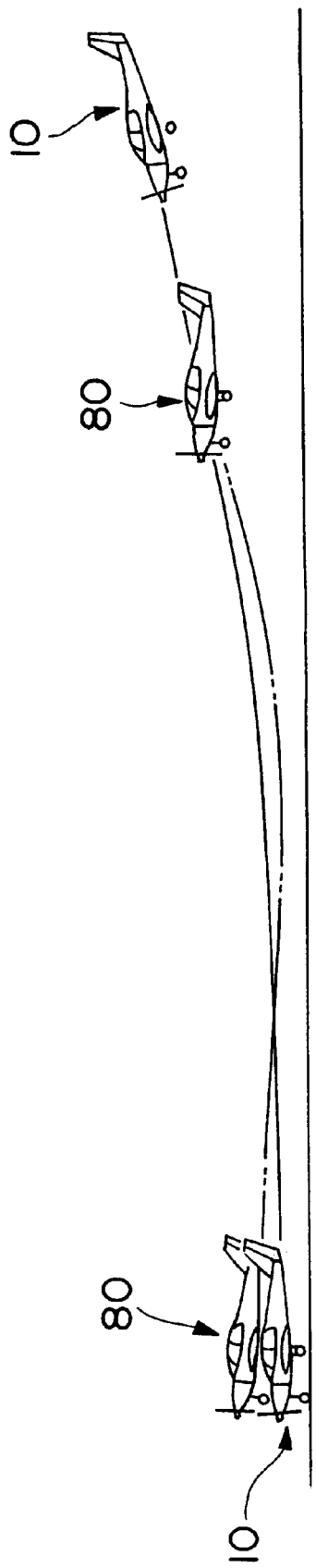
FIG. 6 is a diagram showing a comparison between attitude changes of an airframe when elevators are operated in landing on an aircraft provided with the aircraft lift control method and system of the present invention, and attitude changes during elevators operation in landing for a conventional aircraft.
Figure 7:
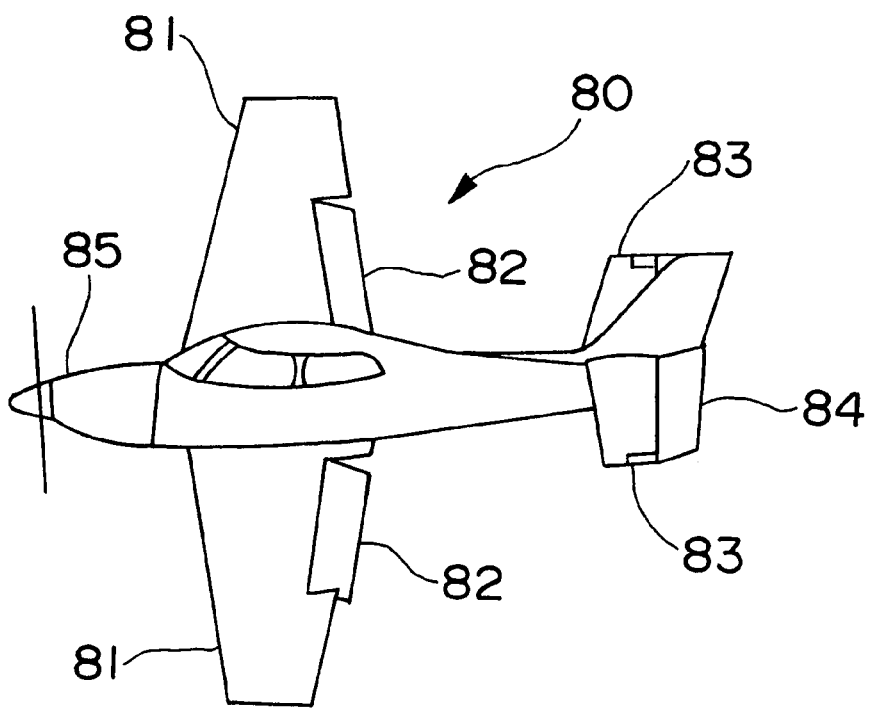
FIG. 7 is a diagram showing a general aircraft.
Figure 8:
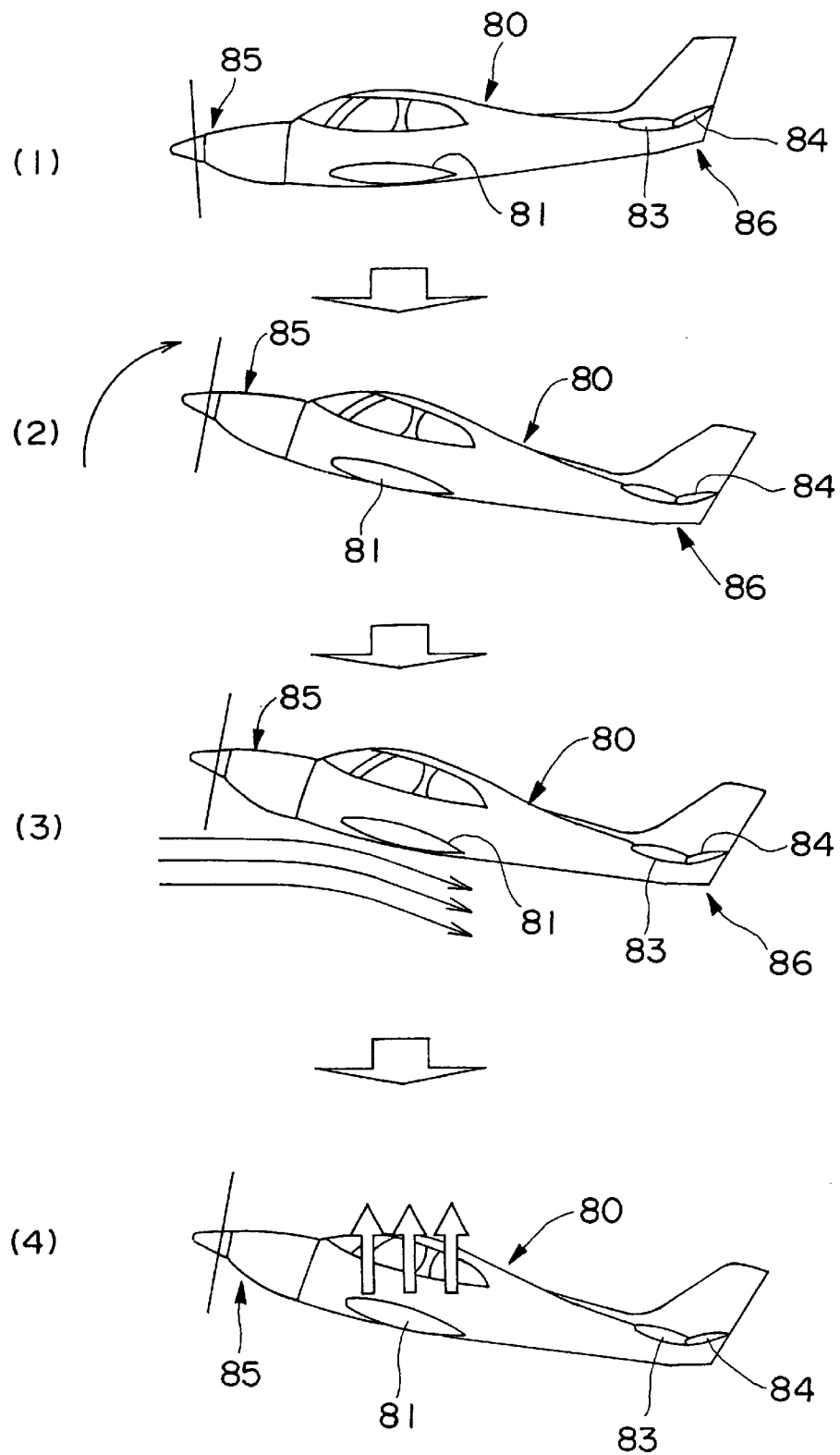
FIGS. 8(1) to 8(4) is a diagram showing attitude changes of an airframe during operation of elevators on a conventional aircraft.

In addition, as shown in FIG. 6, time is required for a necessary amount of lift to be generated and the airframe descends during the period until lift is generated for cases in which descent during landing is performed conventionally by the aforementioned throttle opening regulator operations and elevators operations. The airframe then pulls up, and therefore the control of the airframe during landing is difficult, and the control for landing is complex. For an airframe equipped with the aircraft lift control system of this embodiment, however, a necessary amount of lift conforming to elevator operation can be obtained, and this is particularly effective during lading when speed is reduced and lift is difficult to obtain. The control operations of the air frame in the pitching direction by the pilot during landing can be easily performed.

Note that although an example of using flaps as lift control apparatuses is explained in the embodiment, the embodiment is not limited to flaps, and flaperons may also be used. The range of the present invention is not limited to the embodiment.

What is claimed is:

1. A method of lift control for an aircraft, comprising:
   adjusting the position of an elevator to control lift;
   activating a lift control apparatus mounted on an airframe to obtain lift corresponding to the flight state of the aircraft, the activating of the lift control being executed in coordination with adjusting the position of the elevator;

detecting at least one of an amount of elevator operation and a speed of elevator operation to determine a command value for operating the lift control apparatus based on the detected at least one of the amount and the speed of the elevator operation.

2. A method of lift control of an aircraft according to claim 1, wherein when said elevator is operated in order to climb, said lift control apparatus is controlled such than an amount of lift is to increase, and when said elevator is operated in order to descend, said lift control apparatus is controlled such that the amount of lift is to decrease.

3. A method of lift control of an aircraft according to claim 2, wherein an operation amount in a direction for increasing the lift of said lift control apparatus is controlled so as to become smaller in accordance with an airframe speed becoming lower, and is controlled so as to become smaller in accordance with the airframe speed becoming higher.

4. A method of lift control of an aircraft according to claim 2, wherein control in a direction for increasing the lift of said lift control apparatus is not performed in cases in which the aircraft speed is low and there is a possibility of an airframe stalling when the control is performed.

5. A method of lift control of an aircraft according to claim 2, wherein control in directions for increasing or decreasing the amount of lift of said lift control apparatus is not performed when the aircraft speed is high.

6. A method of lift control of an aircraft according to claim 2, wherein during landing of the aircraft, said lift control apparatus is reset by being controlled so as to increase lift when said elevator is operated for climb after said lift control apparatus is set in a predetermined angular state; and when said elevator is operated for descent, then said lift control apparatus is reset by being controlled so as to decrease the lift.

7. A method of lift control of an aircraft according to claim 1, wherein an angular position of said lift control apparatus set by a pilot is detected, an operation state of elevator operated by the pilot is also detected; and information on the angular position of said lift control apparatus, information on the elevator operation state, and information on speed of the airframe are taken as a basis, and information on a correlation between the aircraft speed and an amount of operation of said lift control apparatus is referenced, and an operation amount of said lift control apparatus is determined.

8. A method of lift control of an aircraft according to claim 1, wherein an information on the elevator operation state is an amount of elevator operation.

9. A method of lift control of an aircraft according to claim 1, wherein an information on the elevator operation state is a speed of the elevator operation.

10. A method of lift control of an aircraft according to claim 1, wherein an information on the elevator operation state is an amount of elevator operation and a speed of the elevator operation.

11. A method of lift control of an aircraft according to claim 1, further comprising:
detecting an indicator position at the point for said lift control apparatus;
detecting the aircraft speed; and
judging whether to perform control of said lift control apparatus in association with the elevator operation so that the lift increases or decreases.

12. A method of lift control of an aircraft according to claim 8, further comprising:
detecting a stall warning signal from a stall warning apparatus that emits a warning in a case where there is a possibility that the airframe may stall when an angle of attack of the airframe becomes equal to or larger than a predetermined angle at a predetermined speed; and
judging whether or not the stall warning signal has been detected, wherein operation of said lift control apparatus in a direction for increasing lift is not performed in cases in which the stall warning signal is detected.

13. A method of lift control of an aircraft according to claim 5, wherein the amount of elevator operation and operation speed are detected based upon operation of a control stick which is mounted in a cockpit and for controlling said elevator.

14. A method of lift control of an aircraft according to claim 1, wherein said lift control apparatuses are flaps.

15. A method of lift control of an aircraft according to claim 1, wherein said lift control apparatuses are flaperons.

16. A system for lift control of an aircraft, comprising:
a lift control apparatus operating portion capable of suitably setting a lift control apparatus so as to obtain a predetermined amount of lift for an airframe;
speed sensors for detecting airspeed; and
a driver apparatus for driving the lift control apparatus based upon commands from said lift control apparatus operation portion, wherein
a control stick mounted in a cockpit is provided with elevator operation state detection sensors capable of detecting an elevator operation state, and a map relating to a correlation between an airframe speed and an operation amount of said lift control apparatus in order to obtain a necessary amount of lift is provided; and
an information on the elevator operation state obtained by said elevator operation state detection sensors, and an information on the airframe speed is taken as a basis, said map is referenced, and an operation amount for said lift control apparatus is obtained, and the lift control apparatus is operated by said driver apparatus based on the operation amount obtained, wherein the information on the state of elevator operation is at least one of an amount of elevator operation and a speed of the elevator operation controlled by the control stick.

17. A system for lift control according to claim 16, wherein the information on the elevator operation state is only the amount of elevator operation controlled by the control stick.

18. A system for lift control according to claim 16, wherein the information on the amount of elevator operation is only the speed of the elevator operation controlled by the control stick.

19. A system for lift control of an aircraft according to claim 16, further comprising a stall warning apparatus that emits a warning in a case where there is a possibility of an airframe stalling because the angle of attack of the airframe is equal to or greater than a predetermined angle at a predetermined speed, and when the stall warning apparatus operates, then operation of said lift control apparatus in a direction for increasing lift is prohibited.

20. A system for lift control of an aircraft according to claim 1, wherein said lift control apparatus is flaps.

21. A system for lift control of an aircraft according to claim 1, wherein said lift control apparatus is flaperons.

* * * * *